Feb. 15, 1966

NOBUTOSHI KIHARA

ROTATING HEAD MAGNETIC RECORDER WITH TAPE EXTENSION OR SHRINKAGE COMPENSATION 3,235,670

Filed Oct. 11, 1960

4 Sheets-Sheet 1

Inventor
Nobutoshi Kihara by Hill, Sherman, Meroni, Gross & Simpson Attys.

Feb. 15, 1966

NOBUTOSHI KIHARA

ROTATING HEAD MAGNETIC RECORDER WITH TAPE EXTENSION OR SHRINKAGE COMPENSATION 3,235,670

Filed Oct. 11, 1960

4 Sheets-Sheet 2

Inventor
Nobutoshi Kihara by Hill, Sherman, Meroni, Gross & Simpson Attys.

Inventor
Nobutoshi Kihara
by Hill, Sherman, Meroni, Gross & Simpson
Attys.

Feb. 15, 1966

NOBUTOSHI KIHARA 3,235,670

ROTATING HEAD MAGNETIC RECORDER WITH TAPE EXTENSION OR SHRINKAGE COMPENSATION

Filed Oct. 11, 1960

4 Sheets-Sheet 4

Inventor
Nobutoshi Kihara by Hill, Sherman, Meroni, Gross & Simpson
Attys.

United States Patent Office 3,235,670
Patented Feb. 15, 1966

3,235,670

ROTATING HEAD MAGNETIC RECORDER WITH TAPE EXTENSION OR SHRINKAGE COMPENSATION

Nobutoshi Kihara, Tokyo, Japan, assignor to Sony Corporation, a corporation of Japan Filed Oct. 11, 1960, Ser. No. 62,033
Claims priority, application Japan, Oct. 15, 1959, 34/32,386; Nov. 6, 1959, 34/34,625, 34/34,626
7 Claims. (Cl. 179—100.2)

This invention relates to a magnetic recorder in which a plurality of magnetic heads are pressed onto a magnetic record medium which is running on the surface of a cylindrical guide with a skew angle relative to the axis of the cylindrical guide member so that the magnetic recording and reproducing of a signal can be performed at the skew angle with the respect to the travelling direction of the magnetic recording medium, and more particularly to such a magnetic recorder adapted for use as a video tape recorder.

One object of this invention is to provide a magnetic video tape recorder which enables one to avoid the dropout of signals by compensating the extension and shrinkage of the magnetic record medium or video tape.

Another object of this invention is to provide a magnetic video tape recorder which allows giving a video tape two side margins on which additional signals such as sound signal and synchronizing pulse signal can be recorded.

A further object of this invention is to provide a magnetic recorder which can be well adapted for a video tape recorder due to the fact that the video tape can be easily operated for putting on or out of the recorder.

A still further object of this invention is to provide a useful and efficient magnetic video tape recorder which enables avoidance of dropout of signals based upon the extension and shrinkage of the magnetic record medium.

Another object of this invention is to provide a magnetic video tape recorder in which a video tape having a wide width is guided on a cylindrical tape guide surface without giving any torsion or other stress.

Other objects, features and advantages of this invention will be more apparent from the description taken in connection with the accompanying drawing in which, FIG. 1 is a schematic representation of a magnetic recorder according to this invention.

Figure 1:
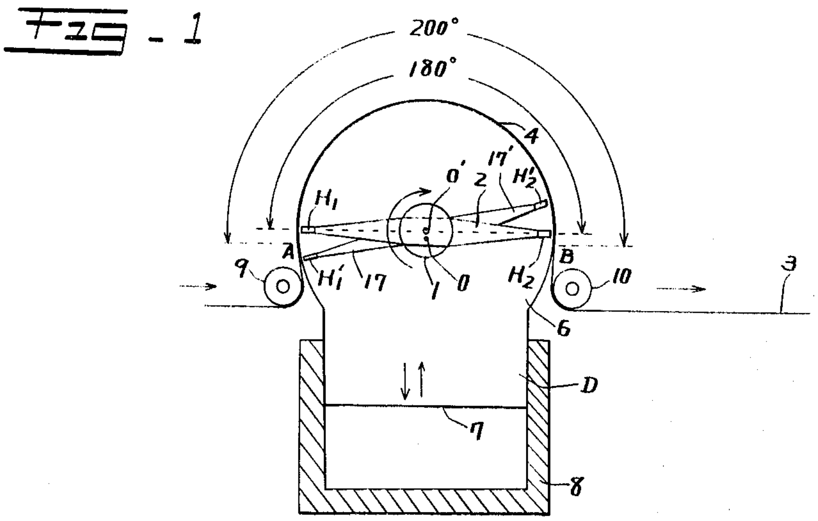

Referrring to the drawing, a plurality of magnetic heads, such for example as magnetic head $H_1$ and $H_2$ are mounted respectively on the free ends of two arms which are attached on a revolving shaft 1. The heads $H_1$ and $H_2$ are held on the arms 2 and are separated from each other by an angle of 180°. A magnetic record tape 3 for video recording having a comparatively large width is arranged to run along arc surfaces 4, which extend more than 180° between points A and B which are slightly beyond the positions of the magnetic heads $H_1$ and $H_2$.

The arc surfaces 4 are preferably formed by cylindrical portions of two guide members 5 and 6, generally expressed by D, which have the axis 0—0 and which are arranged with a close relationship to form an annular air gap *g* or guide groove where the magnetic heads $H_1$ and $H_2$ rotate along substantially the same extended arc surface as the arc surfaces 4 formed by the cylindrical guide members 5 and 6. The axis 0′ of the revolving shaft 1 is fixed at a predetermined position, while the axis 0—0 of the guide members 5 and 6 which form the arc surfaces 4 is adjusted vertically. For this purpose each of the guide members 5 and 6 has a common leg 7 which is fitted to a guide frame 8 to be adjusted vertically with a piston motion as shown by the arrows. The guide members are integrally formed as one guide member having a guide groove.

The magnetic tape 3 travels along the arc surfaces 4 of two guide members 5 and 6 and over the air gap *g* formed therebetween.

In this case the magnetic tape travels in passing through an arc distance (for example, a subtend angle=200°) which is slightly longer than the distance (a subtend angle=180°) between the adjacent magnetic heads $H_1$ and $H_2$.

To this end guide rollers 9 and 10 for the magnetic tape 3 are adequately arranged with respect to the guide members 5 and 6.

Accordingly it will be appreciated in this invention that the magnetic tape does not travel around the whole surface of the cylinder but only along one part of the cylinder. Because of this condition the tape can be easily put on or put off the cylindrical guide members. If, however, the magnetic tape should travel around the whole surface of the cylinder, the attaching and removing operation of the magnetic tape to the cylinder would become very difficult and easy and rapid operation could not be obtained. Moreover the contact surface of the magnetic tape to the cylindrical guide members is increased, which requires larger driving force and which results in more rapid defacement of the tape. With the present invention, however, the above mentioned disadvantages can be avoided because of the fact that the tape travels only over a part of the cylindrical surface.

One example of this invention will be explained in connection with a magnetic video tape recorder. In the arrangement above mentioned, the magnetic tape travels in the direction as shown by the arrows and the magnetic heads $H_1$ and $H_2$ are energized by video signals. Any suitable mechanism, such as a slip ring arrangement can be used to supply the signals to the revolving magnetic heads from a stationary part. Such an arrangement is well known by those skilled in the art and hence a detailed description in connection therewith will be omitted for the sake of simplicity. The video signal for one frame of pictures which are changed at 60 cycles per second can be obliquely recorded by the head $H_1$ on the tape 3 as shown by the scanning line $a_1$ in FIG. 3 and the video signal for the adjacent frame of the pictures can be recorded by the head $H_2$ on the tape 3 as shown by the scanning line $b_1$ which is parallel to the scanning line $a_1$. However, in the case where the scanning lines $a_1$ and $b_1$ are recorded continuously by only one magnetic head, both the end of the record $a_1$ and the beginning of the record $b_1$ arrive at the side edges of the tape 3 so that there is no margin where the end part of the record $a_1$ and the beginning part of the record $b_1$ are overlapped with each other. In this condition, if an extension or shrinkage of the tape occurs, caused by changes of temperature and humidity, dropout or lack of signal will occur during the change of signals. In reproduction, reproducing picture quality becomes worse by the lack of signals.

Figure 3:
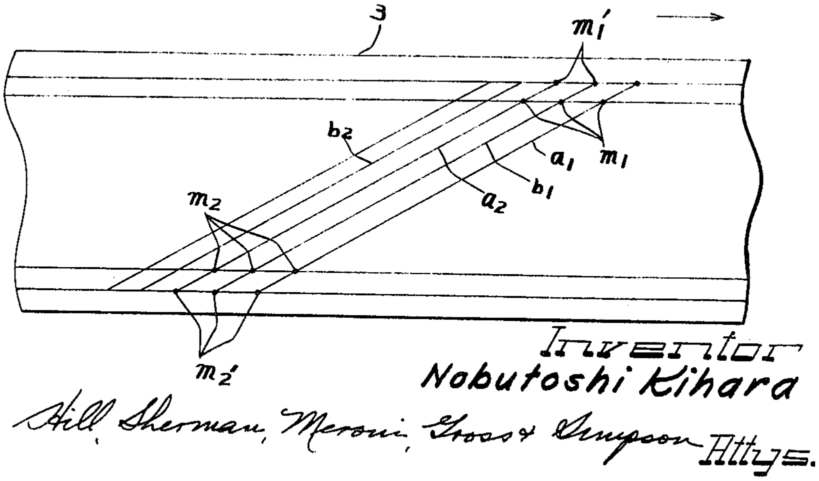
FIG. 3 is a diagrammatic representation of the operation of a magnetic recorder according to this invention.

According to this invention, the heads $H_1$ and $H_2$ are arranged at the distance subtended to the angle of 180°, while the tape travels along the distance subtended to a larger angle, for instance 200°, on the arc surface of the guide members and the arc surface can be adjusted in a vertical direction. Accordingly the records $a_1$ and $b_1$ can be expressed as shown in FIG. 3. That is, the length of the scanning lines of the records are defined by the distance between the points $m_1$ and $m_2$ (FIG. 3) which are positioned inside of the two sides of the tape. The width of the tape part which contacts the arc surface 4 of the guide members 5 and 6 corresponds to the distance $m_1'$–$m_2'$ which extends to both sides of the distance $m_1$–$m_2$.

Accordingly the distances $m'$–$m_1$ and $m_2$–$m_2'$ are the parts on which the both heads record in overlap relationship along the scanning lines $a_1$, $b_1$, $a_2$, $b_2$ . . . . That is, both heads $H_1$ and $H_2$ record the same video signals on the parts. In reproducing, when the video signals recorded on the parts are connected to each other, the whole video signals are continuously reproduced without any lack or dropout, which results in good quality of the reproduced picture. It should be noted that the extension and shrinkage of the magnetic tape will occur, caused by the mechanical stress in the case of change of temperature, humidity or the like. If, in this case, only one magnetic head is used or even if two magnetic heads are cooperated, in such a manner that the oblique scanning lines are fully described from one side to the other side of the magnetic video tape as has been hereinbefore explained, the video signal is lacking in one part thereof when the video tape is extended.

In accordance with this invention, however, the video tape travels along the arc A–B of the guide members 5 and 6 lying beyond the positions of the heads $H_1$ and $H_2$ and the guide members 5 and 6 are constructed so as to adjust vertically as shown by the arrows in FIG. 1. Accordingly, if extension of the video tape occurs, the guide members 5 and 6 or the center thereof are adjusted upwardly, which means that the heads $H_1$ and $H_2$ are lowered downwardly relatively so as to compensate for the extension of the video tape.

Thus the lack of the video signals can be compensated for, which is very important to avoid the deterioration of the picture quality.

Moreover, in accordance with this invention, margins can be obtained outside of the points $m_1'$ and $m_2'$ at the both sides of the video tape by using a plurality of heads in cooperation therewith. The width of the margins can be adjusted by the inclination of the tape with respect to the travelling direction thereof. It is advantageous that audio signals and synchronous pulses can be recorded on the margin thus provided.

Although description has been mainly made in connection with the case where two magnetic heads are mounted on the revolving arms spaced at an angle of 180°, the number of heads can be increased such for example as 3 or 4 heads.

That is, 3 heads can be mounted on revolving arms spaced maintaining 120° apart, and 4 heads separated from each other by an angle of 90°. The length of the magnetic tape which contacts with the arc surface is so selected as to bracket two adjacent heads and in addition to extend slightly beyond the two heads at either end of the bracket. Actually, the contacting length of the magnetic tape can be selected to correspond to an arc surface subtended by more than 90° or 120°. Moreover, corresponding reproducing heads $H_1'$ and $H_2'$ (FIG. 1) are respectively mounted on the arms 17 and 17' directly behind the recording heads $H_1$ and $H_2$ with respect to the revolving direction so that reproducing signals can be obtained during the recording operation of pictures. This reproduction will be advantageous as a means for monitoring the picture quality.

Figure 2:
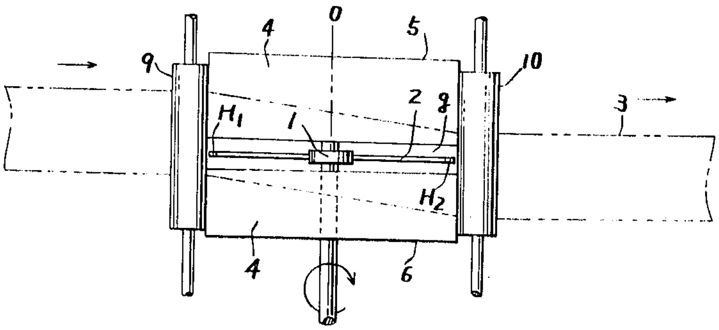
FIG. 2 is a plan view of the magnetic recorder shown in FIG. 1.
Figure 4:
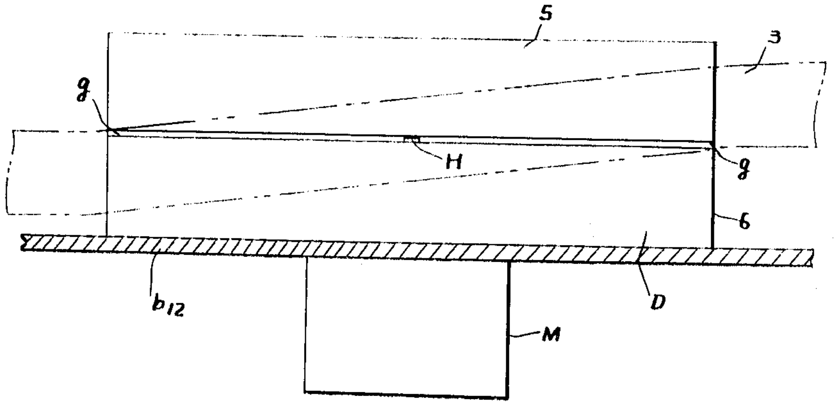
FIG. 4 is a front view of a revolving magnetic head part of a magnetic recorder of this invention.
Figure 5:
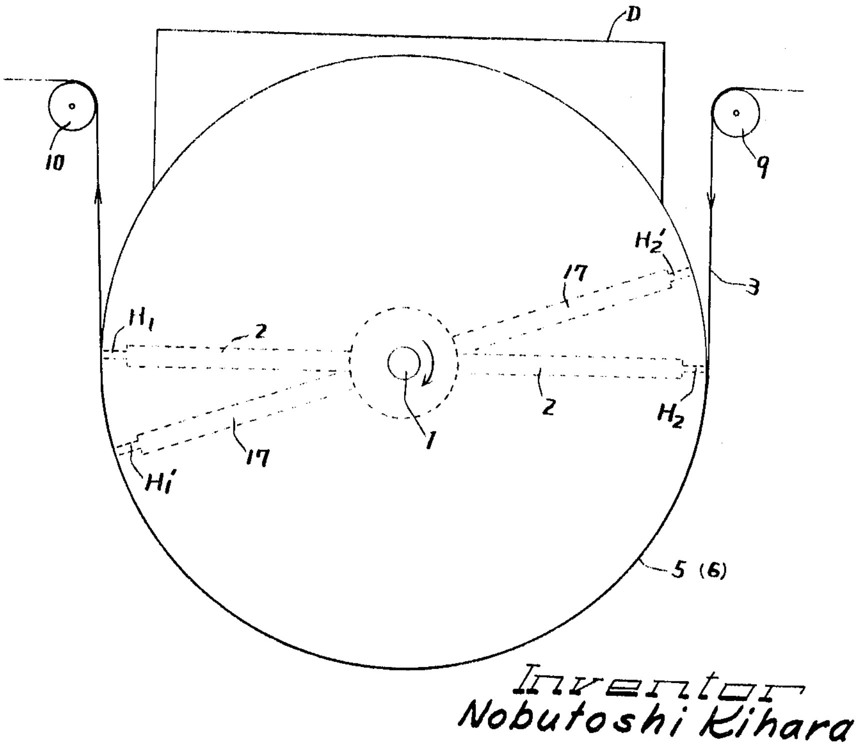
FIG. 5 is a plan view of the arrangement shown in FIG. 4.

FIGS. 4 and 5 show another embodiment of the invention which will be particularly explained in connection with a revolving head arrangement. Cylindrical guide members 5 and 6 are mounted on a base $b_{12}$. M is a driving motor having a drive shaft 1. The parts shown in the figures which correspond to those in FIGS. 1 and 2 have the same references.

Figure 6:
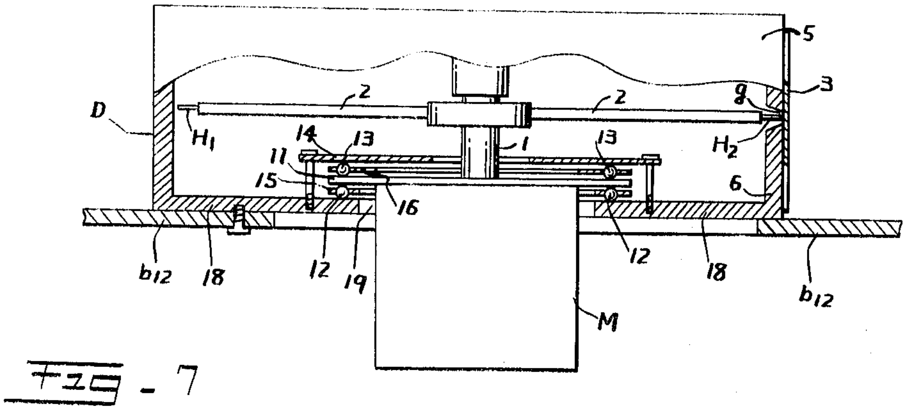
FIG. 6 is a partial sectional view of an arrangement showing how to mount a motor for revolving the magnetic heads.

As shown in FIG. 6, the bottom plate 18 of the cylindrical guide members 5 and 6 is mounted on a base $b_{12}$. The bottom plate 18 is provided with a large aperture 19 at the center thereof, through which an upper part of the driving motor M extends into the cylindrical guide D so that the driving motor may be adjusted in any desired direction with respect to the cylindrical guide D. For this purpose, the driving motor M is provided with a flange 11 at the upper part thereof which is supported on a plurality of balls 12 arranged, at substantially an equal distance, on the periphery of a plate 15. The flange 11 is also pressed by a plurality of balls 13 arranged, at substantially an equal distance, on the periphery of another plate 16.

The balls 13 are, in turn, pressed by a cover plate 14 which is secured to the bottom plate 18 so that the motor M is prevented from vertical movement.

On the revolving shaft 1 of the motor M are mounted the arms 2 on the free ends of which the magnetic heads $H_1$ and $H_2$ are respectively so secured that the heads are passed in the gap $g$, the operating gaps of the heads just being aligned with the surface of the tape 3 guided on the guide members 5 and 6.

In FIG. 6, a fine adjusting mechanism which will be hereinafter described is omitted for illustrating, in detail, the motor mounting mechanism; while, in FIGS. 7 and 8, the motor mounting mechanism is omitted for the sake of simplicity.

Figure 7:
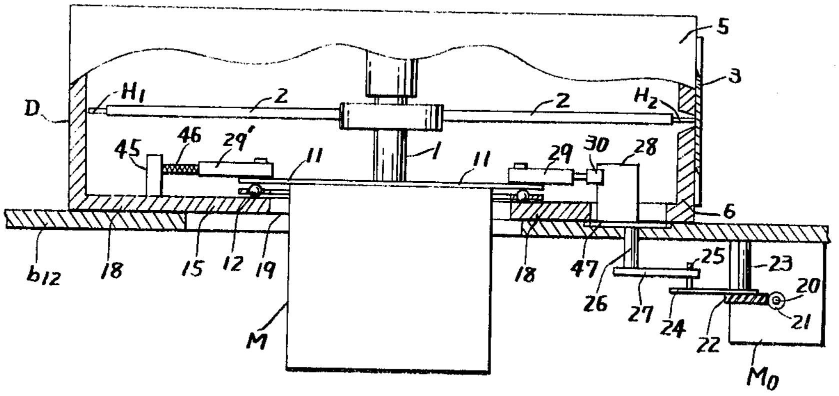
FIG. 7 is a partial sectional view of a fine adjusting apparatus used for a magnetic recorder according to this invention.
Figure 7A:
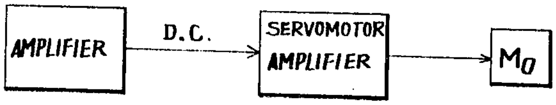
FIG. 7A is a diagrammatic illustration of the servomotor control.

In FIG. 7, a servomotor $M_0$ having a drive shaft 20 is mounted on the base $b_{12}$. The servomotor $M_0$ is arranged to compensate for and delay of the magnetic tape 3 with respect to the standard speed thereof. That is, the servomotor revolves according to the extension and shrinkage of the magnetic tape which causes the delay relationship to a standard signal. FIG. 7A is a diagrammatic representation of a way in which servomotor $M_0$ is energized. On the shaft 20 there is attached a worm gear 21 with which a worm wheel 22 is meshed, the worm wheel 22 being mounted on a shaft 23 which is held by the base $b_{12}$.

On the shaft 23 is attached an arm 24 which can rotate with the shaft 23. At the free end of the arm 24 is mounted a pin 25 with which a disc 47 is engaged. The disc 47 is attached on a shaft 26 which is journaled on the bottom plate 18. When the servomoter $M_0$ rotates, the arm 24 also rotates through the worm gear 21 and worm wheel 22 so that the shaft 26 is also rotated through the pin 25 and the arm 27. On the disc 47 is attached a cylinder 28 at an eccentric axis with respect to the shaft 26. On the flange 11 of the motor M is attached a guide member 29 the free end of which is connected to an abutting member 30 which si shaped to be adapted to the outer surface of the cylinder 28. By the above arrangement, the cylinder 28 rotates eccentrically with respect to the shaft 26 so that the flange 11 and the motor shaft 1 is shifted, through the abutting member 30, relative to the guide members D.

Figures 8, 9, 10, 11, 12:
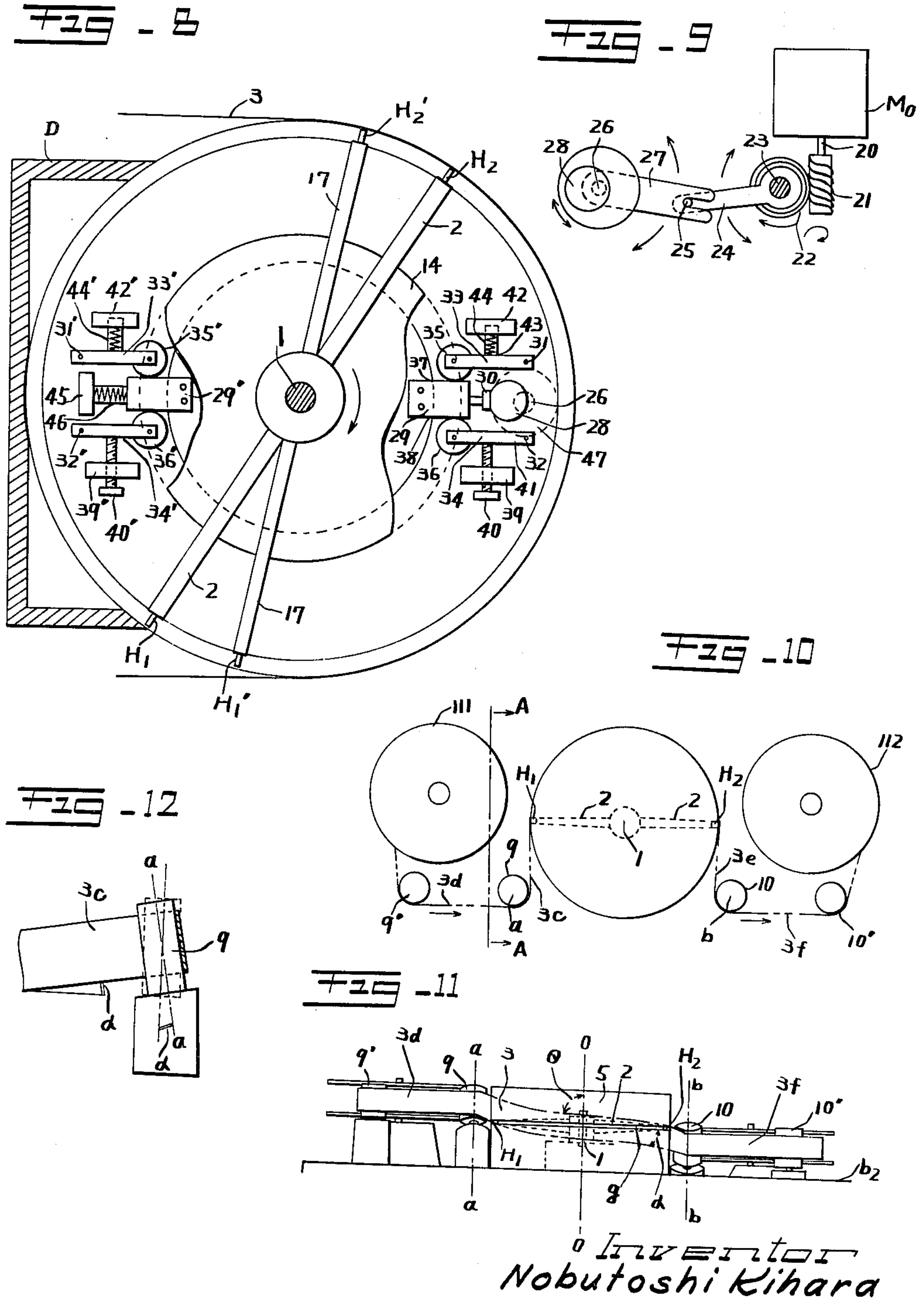
FIG. 8 is a partial sectional plan view of the fine adjusting apparatus shown in FIG. 7.
FIG. 9 is a plan view of a part of the fine adjusting apparatus.
FIG. 10 is a plan view of a driving part of a magnetic recorder according to this invention.
FIG. 11 is a side view of the driving part shown in FIG. 10.
FIG. 12 is a partial sectional view of the driving part along the line A—A of FIG. 10 showing the relationship between a guide roller and a magnetic record tape.

As best seen from FIG. 8, there is arranged at both sides of the cylinder 28 a pair of pins 31 and 32 to which revolving arms 33 and 34 are respectively pivoted. On the free ends of the revolving arms 33 and 34 are respectively attached rollers 35 and 36 which contact respectively on the side walls 37 and 38 of the guide member 29. To the bottom plate 18 is secured a nut 39 through which a screw 40 is screwed and the free end of the screw 40 abuts with the outside face of the revolving arm 34. A spring 44 is interposed between the outer side face of the revolving arm 33 and a stop 42 secured to the bottom plate 18.

By advancing or retracting the screw 40, the guide member 29 which is held between the rollers 35 and 36 (and accordingly the motor shaft 1) can be rotated slightly against the spring 44.

At the opposite side of the guide member 29, another guide member 29′ is attached to the flange 11. A spring 46 is interposed between the guide member 29′ and a stop 45 secured to the base plate 18. The cylinder 28 is eccentrically moved to shift the shaft 1 against the spring 46.

The arrangement for guiding the member 29′ is similar to that for the member 29 so that the same references with a prime indicate the corresponding parts.

In some cases, to the shift 26 will be mounted directly a cam which abuts with the abutting member.

It will be understood that many modifications can be made in connection with the servomotor $M_0$ and its associated eccentric moving means.

According to the above arrangement, the servomotor $M_0$ rotates corresponding to the extension and shrinkage of the magnetic medium so that the movement of the servomotor is transmitted to the cylinder 28. Accordingly, the shaft 1 and hence the positions of the magnetic heads $H_1$ and $H_2$ can be adjusted with respect to the guide members D and the magnetic tape 3. In this case the relative position of the revolving magnetic heads to the tape which is guided by the guiding member D can be adjusted in a desired direction of the tape, if rollers 35, 36 and 35′, 36′ which are respectively abutted with the guide members 29 and 29′, are previously set at desired positions by the screws 40 and 40′.

As hereinbefore referred to, in the magnetic video signal recording apparatus, a plurality of parallel recording tracks is formed obliquely to the travelling direction of the magnetic tape having large width. The magnetic tape contacts and travels obliquely to the surface of the cylindrical guide member which is arranged, for example, vertically. A plurality of recording and reproducing magnetic heads arranged horizontally operate against the surface of the tape. In this case the magnetic tape is so guided that the edges of the tape are supplied to or taken up from the cylindrical surface of the guiding member in a curved surface not in its normal plane. Accordingly, if the tape is pulled in the horizontal plane, the tape is subjected to stress so that the edges of the tape are elongated and shrink irregularly, which causes the disadvantage that the magnetic heads do not coincide with the respective tracks and the magnetic tape is subjected to some irregular strain.

To avoid the above mentioned disadvantages, an arrangement shown in FIGS. 10 and 11 is provided. 111 is a tape supply reel, 112 is a tape take up reel and 9′ and 10′ are guide rollers.

As has been already explained, the cylindrical guiding members 5 and 6 are arranged to form a narrow air gap $g$ therebetween and the magnetic tape 3 contacts the surface of the cylindrical surface and travels in a direction inclined at an angle $\theta$ (FIG. 11) with respect to the center line 0—0 of the cylindrical guide members 5 and 6. The magnetic heads $H_1$ and $H_2$, as has been described, are mounted on the respective arms 2 and 2 to rotate along the air gap $g$.

In accordance with this invention, cylindrical guide rollers 9 and 10 are provided at both sides of the guide members 5 and 6.

At the tape supply side, the axis *a—a* of the cylindrical guide roller 9 is so inclined with respect to the axis of the guide members 5 and 6 that the tape part 3*c* (FIG. 10) which is supplied to the guide members 5 and 6 descends with a desired inclination to the guide members, and the upper and lower edges of the tape part 3*d* reaching from supply reel 111 and a vertically arranged guide roller 9′ to the guide roller 9 are included in a horizontal plane. At the tape take-up side, the axis *b—b* of the guide roller 10 is so inclined with respect to the axis of the guide members 5 and 6 that the tape part 3*e* which is taken out of the guide members 5 and 6 ascends with a desired inclination from the guide members, and that the upper and lower edges of the tape part 3*f* reach from guide roller 10 to a vertically arranged guide roller 10′ and a take up reel 112.

In this case, tape guide roller 9 is so arranged that the tape parts 3*c* and 3*d* will be caused to follow the path indicated in FIG. 10.

For this arrangement, the axis *a—a* of the tape guide roller 9 may be inclined, by the angle $\alpha$ (FIG. 12) which lies between the tape part 3*c* and the normal tape plane, to the tangent direction to the cylindrical guide members 5 and 6 with respect to the vertical direction, as shown in FIG. 12. As to the tape take-up guide roller 10, it is preferable to incline the roller 10 in the opposite direction to the inclination of the roller 9.

It will be understood, however, that it is not always necessary to arrange the guide roller 9 or 10 so that the tape is extended in the rectangular direction by the roller, for either the guide roller 9 or 10 may be so arranged that the side edges of the tape part 3*d* or 3*f* travel in a horizontal direction from the reel 111 or to the reel 112.

It will be also apparent that it is advantageous for the tape guide rollers 9 and 10 to be made to rotate around their axis to minimize friction.

By the above arrangement according to this invention, the guide rollers 9 and 10 can bring the tape to a horizontal position, which tape travels on the surfaces of the cylindrical guide members 5 and 6 in an inclined position with respect to the axis of the guide members.

Accordingly, the tape is supplied to or taken from the horizontally arranged reel without giving any stress to the tape.

In order to securely hold the tape to the surfaces of the cylindrical guide members 5 and 6, a plurality of holes may be formed on the surfaces of the guide members, through which negative pressure can be applied to the back surface of the tape.

It will be understood that many modifications and variations may be effected without departing from the scope of the novel concepts of this invention.

What is claimed is:

1. A magnetic tape recorder comprising
(a) a magnetic tape,
(b) a tape guide member having a cylindrical surface with a guide groove which is formed on said tape guide member so as to describe one part of a circle in a plane perpendicular to the axis of said tape guide member,
(c) holding means for holding said magnetic tape obliquely to the axis of said tape guide member in contacting relationship with the surface of said tape guide member,
(d) means for driving said magnetic tape in one direction on said tape guide member,
(e) a plurality of magnetic heads,
(f) means mounting said heads for rotation about a common axis, said heads being equally spaced from said axis and from each other, said heads also being positioned for contact with said magnetic tape along said guide groove,
(g) means for rotating said magnetic heads,
(h) adjusting means for shifting said common axis of head rotation relative to said tape guide member, and
(i) automatic control means connected to said adjusting means to provide for continuous adjustment in the position of said common axis of head rotation relative to said tape guide member to continuously compensate for variations in tape extension and shrinkage.

2. A magnetic tape recorder comprising
(a) a magnetic tape,
(b) a tape guide member having a cylindrical surface with a guide groove which is formed on said tape guide member so as to describe one part of a circle on a plane perpendicular to the axis of said tape guide member,
(c) holding means for holding said magnetic tape obliquely to the axis of said tape guide member in contacting relationship with the surface of said tape guide member,
(d) said holding means comprising a pair of guide rollers which are respectively so disposed at opposite sides of said tape guide member that a slightly longer arc length of said magnetic tape than the length between the adjacent magnetic heads is passing on the surface of said guide member,
(e) means for driving said magnetic tape in one direction on said tape guide member,
(f) a plurality of magnetic heads,
(g) revolving means rotatable about an axis and mounting said heads in such a manner that the magnetic heads have equal angles therebetween about said axis and are arranged for contact with said magnetic tape along said guide groove,
(h) an electric motor for rotating said revolving means,
(i) adjusting means for adjusting the relative position between the axis of rotation of said revolving means and said tape guide member to shift the axis about which said magnetic heads rotate relative to the arc length of said magnetic tape passing on the cylindrical surface of said tape guide member, and
(j) automatic control means connected to said adjusting means to provide for continuous adjustment in the position of the axis of rotation of said revolving means relative to said tape guide member to continuously compensate for variations in tape extension and shrinkage.

3. A magnetic tape recorder comprising
(a) a magnetic tape,
(b) a tape guide member having a cylindrical surface with a guide groove which is formed on said tape guide member so as to describe one part of a circle in a plane perpendicular to the axis of said tape guide member,
(c) holding means for holding said magnetic tape obliquely to the axis of said tape guide member in contact relationship with the surface of said tape guide member,
(d) said holding means comprising a pair of guide rollers which are respectively so disposed at opposite sides of said tape guide member that a slightly longer arc length of said magnetic tape than the arc length between the successive adjacent magnetic heads is in contact with the surface of said guide member,
(e) means for driving said magnetic tape in one direction on said tape guide member,
(f) a plurality of recording heads,
(g) revolving means for mounting said recording heads in such a manner that the angles between successive recording heads are equal with the heads arranged to contact said magnetic tape along said guide groove,
(h) an electric motor for rotating said revolving means about an axis,
(i) a plurality of reproducing magnetic heads which are mounted on said revolving means directly behind the respective recording heads so as to trace the respective tracks of the corresponding recording heads,
(j) adjusting means for shifting said axis of said revolving means relative to said tape guide member,
(k) said tape guide member providing the sole support and guidance for the portion of the magnetic tape extending between said guide rollers except for the contact of said recording heads and said reproducing magnetic heads with said portion of the magnetic tape extending between said guide rollers, and
(l) automatic control means connected to said adjusting means to provide for continuous adjustment in the position of said axis of said revolving means relative to said tape guide member to continuously compensate for variations in tape extension and shrinkage.

4. A magnetic tape recorder comprising
(a) a magnetic tape,
(b) a tape guide member having a cylindrical surface with a guide groove which is formed on said tape guide member so as to describe one part of a circle in a plane perpendicular to the axis of said tape guide member,
(c) holding means for holding said magnetic tape obliquely to the axis of said tape guide member in contacting relationship with the surface of said tape guide member,
(d) said holding means comprising a pair of guide rollers which are respectively so disposed at opposite sides of said tape guide member that a slightly longer arc length of said magnetic tape than the length between the adjacent magnetic heads is in contact with the surface of said guide member,
(e) means for driving said magnetic tape in one direction on said tape guide member,
(f) a plurality of recording heads,
(g) revolving means for mounting said recording heads in such a manner that the angles between successive recording heads are equal and the heads are arranged for successive contact with said magnetic tape along said guide groove,
(h) an electric motor for rotating said revolving means,
(i) a plurality of reproducing magnetic heads which are respectively mounted on the revolving means so as to trace the respective tracks of the corresponding recording heads,
(j) means for adjusting the absolute position of said electric motor together with said revolving means in a plane perpendicular to the axis of rotation of said revolving means, and
(k) automatic control means connected to said adjusting means to provide for continuous adjustment in the absolute position of said electric motor together with said revolving means to continuously compensate for variations in tape extension and shrinkage.

5. A magnetic tape recorder comprising
(a) a magnetic tape,
(b) a tape guide member having a cylindrical surface with a guide groove which is formed on said tape guide member so as to describe one part of a circle in a plane perpendicular to the axis of said tape guide member,
(c) holding means comprising guide rollers for holding said magnetic tape obliquely to the axis of said tape guide member in contacting relationship with the surface of said tape guide member,
(d) the axes of said guide rollers on the tape supply and take-up sides being so inclined with respect to the axis of said tape guide member that the side edges of the tape parts to be supplied from a supply reel and to be led to a take-up reel lie in planes at right angles to the axis of said tape guide member,
(e) means for driving said magnetic tape in one direction on said tape guide member, (f) a plurality of magnetic heads, (g) revolving means mounting said magnetic heads in such a manner that the angles between successive magnetic heads are maintained equal with the heads disposed for contact with said magnetic tape along said guide groove, (h) an electric motor for rotating said revolving means about an axis, (i) adjusting means for adjusting the relative position between the axis of rotation of said revolving means and said tape guide member to shift the axis about which said magnetic heads rotate relative to the arc length of said magnetic tape passing on the cylindrical surface of said tape guide member, (j) said tape guide member providing the sole support and guidance for the portion of the magnetic tape extending along said tape guide member and guide groove except for the contact of said magnetic heads with said portion of the magnetic tape extending along said tape guide member and guide groove, and (k) automatic control means connected to said adjusting means to provide for continuous adjustment in the position of said axis of rotation of said revolving means relative to said tape guide member to continuously compensate for variations in tape extension and shrinkage.

6. A transducer system comprising (a) an elongated record medium having a record surface with an extensive length dimension and a substantial width dimension at right angles to said length dimension, (b) a plurality of record medium scanning means, (c) means mounting said scanning means for rotary movement along a curved path, (d) means for forming a portion of the length of said surface of said record medium into a curved configuration with the surface of said record medium coinciding with the curved path of said scanning means along an obliquely extending portion of the record medium surface which portion extends at an oblique angle to the length dimension of the record medium, (e) means for moving the record medium in a direction parallel to its length dimension to provide for scanning of successive obliquely extending portions of the record medium by the scanning means, and (f) means for adjusting the relative positions of the mounting means and the forming means to adjust the position of the curved path of the scanning means relative to the portion of the length of the surface of the record medium which is formed into a curved configuration, and (g) automatic control means connected to said adjusting means to provide for continuous adjustment in the position of said curved path of said scanning means relative to the portion of the length of the surface of the record medium which is formed into a curved configuration to continuously compensate for variations in tape extension and shrinkage.

7. A transducer system comprising (a) an elongated tape record medium movable along an open loop tape path of less than 360° in total extent with the center line of the tape record medium defining an arcuate open loop center line path, (b) record medium scanning means, (c) means mounting said scanning means for rotation about an axis disposed at an oblique angle to the arcuate center line path of the tape record medium with the scanning means scanning along a scanning path conforming to the surface of the tape record medium at said open loop tape path but forming an oblique angle relative to the center line of the tape record medium at said arcuate center line path, and (d) means for guiding the portion of the tape record medium traveling about said open loop tape path to maintain said scanning means in scanning relation to the tape record medium over an extent of arcuate travel of said scanning means of substantially greater than 180°, (e) means for adjusting the position of the axis of rotation of said scanning means relative to the position of said open loop tape path, and (f) automatic control means connected to said adjusting means to provide for continuous adjustment in the position of said axis of rotation of said scanning means relative to the position of said open loop tape path to continuously compensate for variations in tape extension and shrinkage.

References Cited by the Examiner

UNITED STATES PATENTS

| | | | |
|---|---|---|---|
| 2,909,616 | 10/1959 | Marty | 179—100.2 |
| 3,042,756 | 7/1962 | Buslik | 179—100.2 |
| 3,071,644 | 1/1963 | Olive | 179—100.2 X |
| 3,075,049 | 1/1963 | Gordon et al. | 179—100.2 |
| 3,159,501 | 12/1964 | Maxey | 179—100.2 |

FOREIGN PATENTS

| | | |
|---|---|---|
| 1,188,391 | 12/1957 | France. |
| 888,874 | 2/1962 | Great Britain. |

BERNARD KONICK, *Primary Examiner.*

NEWTON N. LOVEWELL, IRVING L. SRAGOW, *Examiners.*